United States Patent
Woldanski

(10) Patent No.: US 6,224,982 B1
(45) Date of Patent: May 1, 2001

(54) NORMAL INCIDENCE MULTI-LAYER ELASTOMERIC RADAR ABSORBER

(75) Inventor: Greg L. Woldanski, Castaic, CA (US)

(73) Assignee: Lockhead Martin Corporation, Palmdale, CA (US)

( * ) Notice: Subject to any disclaimer, the term of this patent is extended or adjusted under 35 U.S.C. 154(b) by 0 days.

(21) Appl. No.: 09/467,970

(22) Filed: Dec. 21, 1999

(51) Int. Cl.[7] ............................. B32B 9/04; H01Q 17/00
(52) U.S. Cl. ............................ 428/411.1; 156/308.6; 156/310; 342/1
(58) Field of Search .................... 342/1, 2, 3, 4; 156/308.6, 310, 60; 89/36.01–36.17; 244/133; 428/411.1

(56) References Cited

U.S. PATENT DOCUMENTS

| | | | |
|---|---|---|---|
| 5,192,810 | * 3/1993 | Hill | 521/52 |
| 5,225,284 | * 7/1993 | Tusch | 428/409 |
| 5,576,710 | * 11/1996 | Broderick et al. | 342/1 |
| 5,845,877 | * 12/1998 | Justice et al. | 244/131 |
| 5,922,986 | * 7/1999 | Wanninger et al. | 89/36.17 |
| 6,111,534 | * 8/2000 | Escarmant | 342/1 |

* cited by examiner

Primary Examiner—Michael W. Ball
Assistant Examiner—John T Haran
(74) Attorney, Agent, or Firm—Robert A. Schruhl

(57) ABSTRACT

A method for making an improved radar absorbing structure which includes forming a stack of layers of elastomeric sheet material, at least one of which supports conductive material, with a layer of dielectric material, shaping the stack, and curing the shaped stack. The stack of layers has a thickness of no more than 0.1", and may be wrapped about a mandrel or fitted to another forming body to impart a final, complex, shape to the stack, and then cured.

10 Claims, 2 Drawing Sheets

NORMAL INCIDENCE MULTI-LAYER ELASTOMERIC RADAR ABSORBER

BACKGROUND OF THE INVENTION

1. Field of the Invention

The present invention relates to radar absorber structures, and more particularly to multi-layer radar absorbing structures made of environmentally compliant materials.

2. Description of the Related Art

The use of multi-layer radar absorbing material substrates is well-known.

For example, U.S. Pat. No. 5,922,986 issued Jul. 13, 1999 to Wanninger et al. discloses an armor plating for vehicles that has, at its outer side, a layer of plastics material bound explosive containing radar absorbing materials. The armor plate comprises a plate shaped module having an exterior surface arranged to face outwardly from the vehicle and an interior surface arranged to face toward the vehicle, the plate shaped module including an explosive material bound with a plastics material binder containing a radar absorbing material.

U.S. Pat. No. 5,192,810 issued Mar. 9, 1993 to Hill discloses a method and apparatus for manufacturing dimpled structures from elastic cloth. The method permits forming complex polyimide foam shapes by impregnating a low density, open cell, reticulated foam with polyimide foam precursor, placing the combination in a mold, closing the mold, then heating the assembly to the foaming and curing temperatures of the precursor. As the powdered precursor expands, it spreads throughout the reticulated foam producing a product having substantially uniform density and polyimide foam characteristics. If desired, the reticulated foam can be removed from the product by using a material that outgasses and boils away at polyimide processing temperatures. Radar absorbing materials may be incorporated in the reticulated foam so that the final product will have uniformly distributed radar absorbing components with desirable high temperature resistance and other properties of polyimide foams.

U.S. Pat. No. 5,845,877 to Justice et al., issued on Dec. 8, 1998, discloses a sealing assembly for reducing the gap between an aircraft's movable flight control member and adjacent structures. The flight control member and adjacent structures have external surfaces and side surfaces facing each other. First and second flexible bulb seals are mounted on the periphery of the side surface of both the flight control member and the adjacent structure forming an extension of the external surface of both. Each bulb seal includes a compressible foam bulk absorber core. A first sheet of dielectric material is bonded to the bottom surface of the core. A second sheet of flexible resistive material is bonded to the top, and sides of the core. A third sheet of flexible magnetic radar absorbing material is bonded to the second sheet. A fourth sheet of flexible abrasion resistant material is bonded over the third sheet.

All of these absorbers, however, suffer from a variety of drawbacks. First, repeated flexure of such absorbers tends to result in failure of the elasticity or structural integrity of the various substrates. Second, the multi-layer absorbers are rendered defective due to improper distribution of the conductive material in or on the foam substrates. Third, the weight of the absorber and conductive filler often exceeds the limits of the anticipated application. Fourth, repeatability in manufacture, with a significant level of quality, is rarely achieved.

Against this background of known technology, the applicant has developed a novel method for forming a multi-layer elastomeric absorber including radar absorbing material in at least one of the layers so that the multi-layer absorber will achieve normal incidence absorption at selected frequencies, while overcoming many of the deficiencies and drawbacks of similar absorbers currently known in the relevant technology.

OBJECTS AND SUMMARY OF THE INVENTION

It is therefore an object of the present invention to provide an improved multi-layer elastomeric normal incidence absorber containing radar absorbing materials for the attenuation of electromagnetic energy.

Another object is to provide a multi-layer absorber structure having at least one layer bearing a conductive deposition of a radar absorbing material.

Still another object of the invention is to provide an elastomeric RAM absorber having multiple layers which define absorbance regions and incorporate environmentally compliant materials.

A still further object is to provide a multi-layer absorber having a construction that facilitates attenuation of electromagnetic energy or radar over a broad range of frequencies.

The above objects are achieved according to the invention by the provision of an elastomeric multilayer substrate having electromagnetic energy attenuation characteristics which preferably comprises a flexible RAM material bearing a conductive material applied to a surface of at least one of the layers. The conductive material is preferably comprised of a particulate material, such as carbon powder, or a combination of carbon and a metal such as silver, copper or nickel, or a conductive ink comprised of the conductive particulate in a precursor solution. The multilayer product of the invention can be made thinner and lighter than conventional absorbers, with a preferred thickness being on the order of 0.100 inches. The multilayer product of the invention is far more durable and reproducible than existing multi-layer absorbers.

Other objects, advantages and features of the invention will become more apparent, as will equivalent structures which are intended to be covered herein, with the teaching of the principles of the invention in connection with the disclosure of the preferred embodiments thereof in the specification, claims and drawings in which:

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an improved process for forming a low density, reticulated foam filled absorber that encompasses many long sought after features that render such absorbers lighter and less costly to manufacture.

Figure 1:
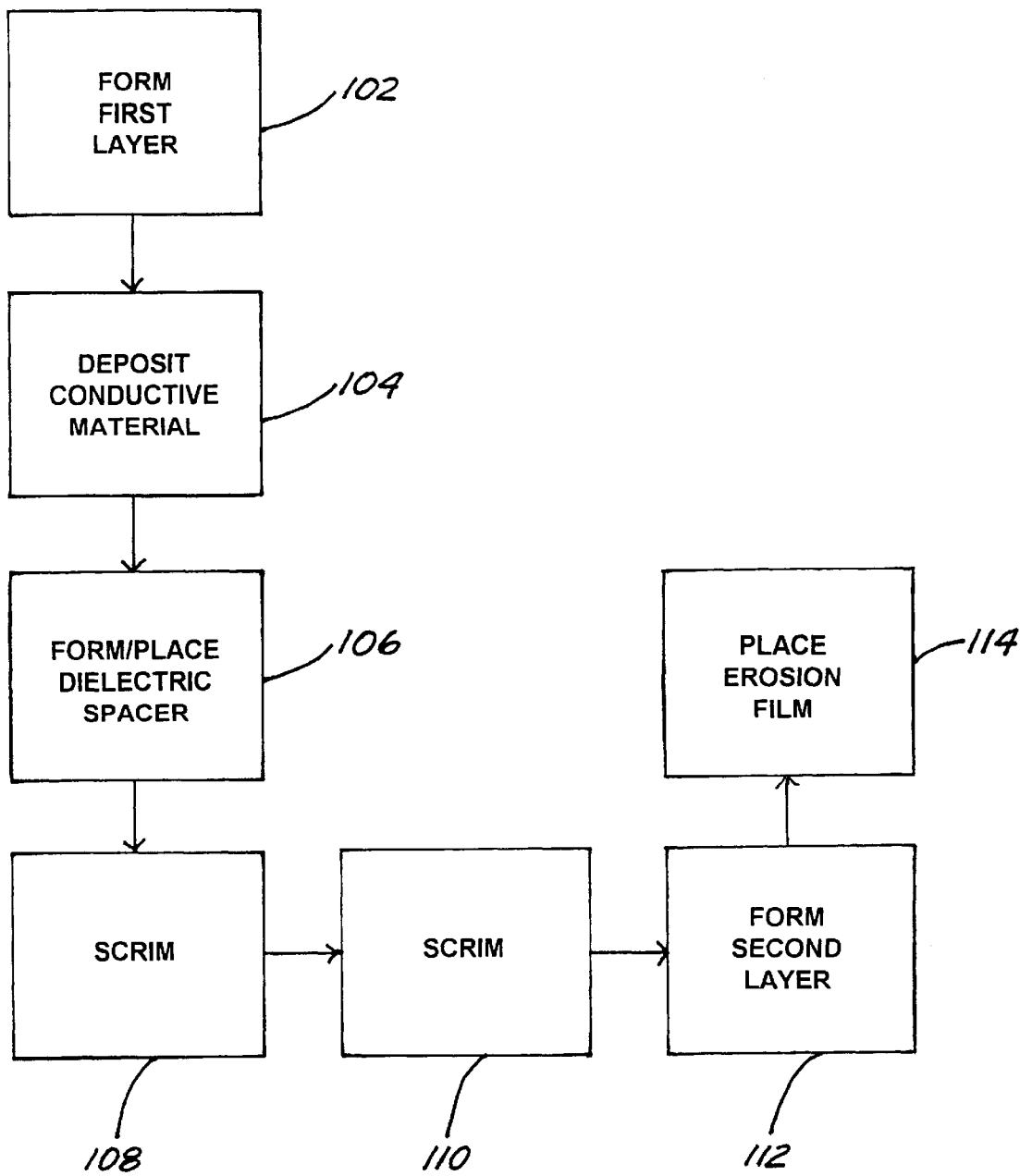
FIG. 1 is a schematic diagram showing preferred steps of the method of the present invention.
Figure 2:
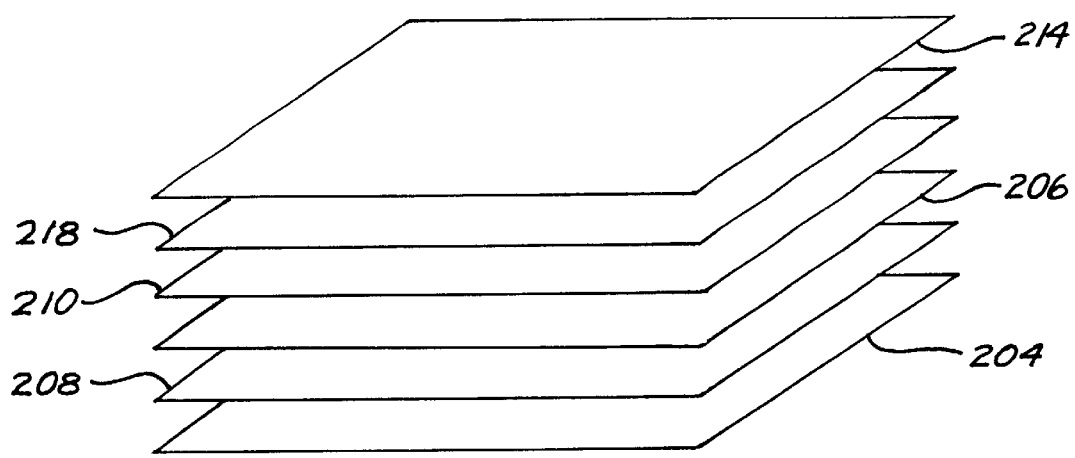
FIG. 2 is an exploded view of the multilayer product resulting from the process of the invention performed in accordance with method steps of FIG. 1.

Referring now to FIGS. 1 and 2, the process of manufacture for the multi-layer absorber of the present invention comprises a first step 102 of forming the first or bottom layer 202 of the absorber stack. The first layer of the stack comprises a semi-flexible matrix, said matrix preferably flexible urethane or silicon. The matrix is cast upon a substrate, and after attaining a desired thickness, the substrate is cured. The second step 104 consists of depositing a layer of conductive material on one or both sides of the substrate. Preferably, the conductive material is a conductive particulate mixture containing carbon or other conductive substances. A preferred method of effecting deposit of the conductive material on the substrate surface is by silk screening whereupon a predetermined pattern of deposition can be effected. The substrate is then subjected to appropriate tests to make sure it meets requisite electrical specifications. Next, as represented by block 106 in FIG. 1, a dielectric spacer 206 is disposed atop the first layer. The dielectric spacer 206 is preferably made of the same material as the flexible substrate 204, but without the conductive material. Block 108 represents the step of interposing a layer of nylon scrim 208 between the flexible substrate 204 and the dielectric spacer 206. The scrim 208 acts as an adhesive between layers 204 and 206. Block 110 represents the step of disposing a second layer of nylon scrim 210 over the dielectric spacer 206. Block 112 represents the step of disposing a second flexible substrate 212 over the second scrim layer 210. Preferably, the thickness of the second flexible substrate is greater than the thickness of the first flexible substrate. Once all the layers have been secured in a stack, they are pressed together with a pressure sufficient to effect secure attachment, tantamount to their being glued together. The electrical performance of the stack is then measured to determine if its attributes fall within the range of permissible limits. Block 114 represents the disposition, atop the second flexible substrate, of a thin erosion film 214, preferably flexible urethane in a thickness range of 0.012–0.014. inches. Following securement of all layers as a stack, as for example by gluing, the component is allowed to sit for about 10 minutes before being formed, either by cutting out using a template (block 116) or by wrapping the part around a mandrel or other shaping tool and subjecting the "shaped" part to vacuum to permit it to set. The finished thickness of the part is desirably about 0.10".

It is contemplated that the foam absorber of the present invention can be employed for any application to attenuate electromagnetic or radar energy, e.g. in aircraft components of aircraft where it is desired to avoid radar detection, or in applications for reducing background noise levels, e.g. from an antenna.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

What I claim is:

1. A method for making an improved absorber, comprising:

providing a first layer of elastomeric sheet material, depositing on said first layer a conductive material that acts as a radar absorbing material, covering the first layer, with the conductive material deposited thereon, with a dielectric material, and covering the dielectric material with a second layer of elastomeric sheet material, whereby the first and second layers of elastomeric material are stacked one on top of the other, with the conductive material and the dielectric material therebetween, to form a sheet structure capable of absorbing electromagnetic energy.

2. The method of claim 1, and further including the step of covering the second layer with a rain erosion film.

3. The method of claim 1, wherein said layers are affixed to one another in said stack.

4. The method of claim 3, wherein said layers are glued to one another.

5. The method of claim 2, wherein the overall thickness is about 0.1".

6. The method of claim 1, wherein the step of depositing conductive material on said first elastomeric layer comprises a silk screening process.

7. The method of claim 1, wherein said dielectric material comprises elastomeric sheet material without conductive material.

8. The method of claim 1, wherein said layers form a stack of sheet material, and further comprising the step of forming said sheet material into a shape.

9. The method of claim 8, wherein said forming step includes wrapping said sheet material about a mandrel and curing said wrapped sheet material.

10. An improved radar absorber structure, comprising:

a stack of layered materials, including a first layer of elastomeric material bearing conductive material thereon, a layer of dielectric material comprising elastomeric material without said conductive material which covers the first layer, and a second layer of elastomeric material which covers the dielectric material.

* * * * *